W. R. WHITE.
POULTRY CRATE.
APPLICATION FILED SEPT. 26, 1913.
1,138,918.
Patented May 11, 1915.
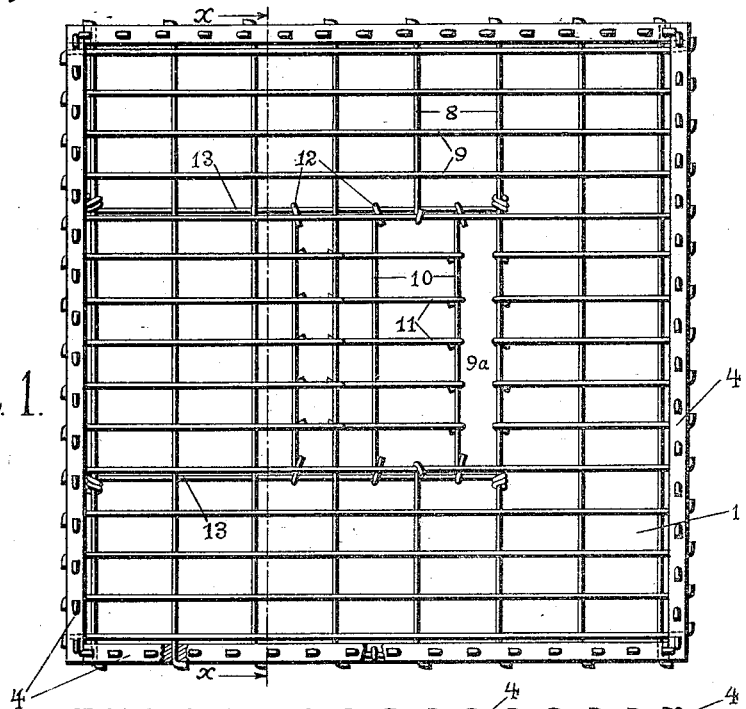
Fig. 1.
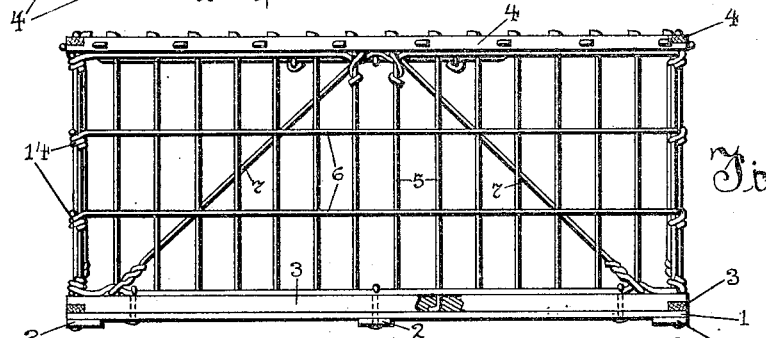
Fig. 2.
Fig. 3.
WITNESSES:
C. A. Ellis.
R. E. Bruckner.
INVENTOR
W. R. White
BY
John M. Spellman
ATTORNEY

UNITED STATES PATENT OFFICE.

WILLIAM R. WHITE, OF DENISON, TEXAS, ASSIGNOR OF ONE-HALF TO R. S. LEGATE, OF DENISON, TEXAS.

POULTRY-CRATE.

1,138,918. Specification of Letters Patent. Patented May 11, 1915.

Application filed September 26, 1913. Serial No. 791,996.

*To all whom it may concern:*

Be it known that I, WILLIAM R. WHITE, a citizen of the United States, residing at Denison, in the county of Grayson and State of Texas, have invented certain new and useful Improvements in Poultry-Crates, of which the following is a specification.

My invention relates to poultry crates, and relates more particularly to such poultry crates as have their walls formed either partially or entirely of wire.

It is the object of my invention to provide a poultry crate having its side walls and top formed of wires transversely crossing each other and welded together at their joints, thus giving the walls great strength and rigidity.

Another object is to provide a poultry crate that will have its side walls so braced and reinforced that the crate will not break down even though subjected to a considerable weight.

A still further object is to provide a poultry crate having a very simple and convenient door in its top.

Finally, the object of my invention is to provide a poultry crate that will have a light but very durable construction and can be very readily washed out when desired, and may be manufactured at a comparatively low cost.

With these and various other objects in view, my invention has relation to certain novel features of construction and use, an example of which is described in the following specification, and is illustrated in the accompanying drawings, wherein:

Figure 1 is a plan view of my crate. Fig. 2 is a view of the same in side elevation. Fig. 3 is a vertical sectional view of the crate, the section being taken upon the line $x$—$x$ of Fig. 1.

Referring now more particularly to the drawings, wherein like reference characters designate similar parts in all the figures, the numeral 1 denotes the bottom of my crate, which will preferably be formed of boards having transverse strips 2 rigidly secured across their extremities and centers. Upon each edge of the bottom, a wooden strip 3 is secured, the joined extremities of said strips being rabbeted together. The top of my crate is provided with a rectangular frame comprised of strips 4 parallel and similar to the strips 3. Through the members 3 and 4 are respectively passed the extremities of heavy vertical wires 5 equidistantly spaced and included in each side wall of the crate. Said extremities are allowed to project respectively above and below the members 4 and 3, and are bent at a right angle into contact with said members. In each side wall, there is included a plurality of equally spaced horizontal wires 6, which are welded to the wires 5 in crossing the same. In each side wall, there will furthermore be included two diagonal brace wires 7 extending from the lower corners of the walls to center of the top thereof. The top of my crate is formed by wires 8 and 9 crossing each other transversely, the extremities of the wires 8 being passed through the two strips 4 at opposite sides of the top, and the extremities of the strips 9 being passed through the other two strips 4. The ends of the wires 8 and 9 will project slightly beyond the strips 4 and will be bent at a right angle against the lateral faces of said strips. The wires 8 and 9 will be welded together where crossing each other.

In the top of the crate, and substantially at the center thereof, a rectangular opening $9^a$ is formed, which opening is adapted to be closed by a sliding door formed of wires 10 and 11, respectively parallel to the wires 8 and 9. The wires 10 and 11 are welded together where crossing each other. The extremities of the wires 10 are hooked as indicated at 12 and are adapted to slide upon a pair of wires 13 parallel to the wires 9 and disposed just beneath the top of the crate. The extremities of the wires 13 are secured to two of the wires 8, and are sufficiently spaced to allow the sliding door a sufficient movement to open or close the same.

The top of my crate will preferably be each separately formed, and in assembling the crate, the extremities of the wires 6 will be twisted about the end wires 5 at each corner of the crate, as indicated at 14. By welding together the wires of my crate wherever they are crossed, great strength and rigidity is given to the crate walls.

The invention is presented as including all such modifications and changes as properly come within the scope of the following claims:

What I claim is:

1. A poultry crate comprising a rectangular floor, wires projecting vertically upward from each corner of the floor, a rectangular top frame united at its corners to the upper ends of the vertical wires and supported thereby, two sets of wires arranged transversely of each other and having their ends secured respectively in opposite sides of the top frame, said wires welded together at their crossing points to form with the frame the top or cover for the crate, and two sets of wires arranged transversely of each other at each end or side of the crate said wires welded together at their crossing points to form a side wall for the crate, the ends of one set of wires for each side wall being secured in respectively the top frame and bottom floor of the coop and the ends of the wires of the other set being firmly secured to the vertical corner wires of the crate.

2. A poultry crate formed of a bottom or floor, a top and four sides and vertical wires forming a connection between the floor and top, the top consisting of a rectangular frame with crossing wires secured at their respective ends in the sides and ends of the frame, each side consisting of crossing wires secured at their respective vertical ends in the top frame and in the floor of the crate and at their horizontal ends to the vertical corner wires, and bracing means for each side wall consisting essentially of two wires extending diagonally across the wires of the side wall from a corner vertical wire to the top frame.

In testimony whereof I have signed my name to this specification in the presence of two subscribing witnesses.

WILLIAM R. WHITE.

Witnesses:
  J. A. BUCKMAN,
  W. S. HIBBORD.

Copies of this patent may be obtained for five cents each, by addressing the "Commissioner of Patents, Washington, D. C."